United States Patent [19]
Johnson et al.

[11] Patent Number: 4,898,678
[45] Date of Patent: Feb. 6, 1990

[54] HEAVY-METAL SEPARATOR FOR DRINKING WATER

[76] Inventors: Charles G. Johnson, 19150 Saddle La., Apple Valley, Calif. 92308; Candido O. Sanchez, 953 Arbor St., Costa Mesa, Calif. 92627

[21] Appl. No.: 282,685

[22] Filed: Dec. 12, 1988

[51] Int. Cl.$^4$ .............................................. B01D 21/02
[52] U.S. Cl. .................... 210/741; 210/744; 210/803; 210/806; 210/104; 210/110; 210/134; 210/258; 210/535; 210/912; 210/121
[58] Field of Search ............... 210/741, 744, 800, 803, 210/806, 912, 104, 110, 121, 134, 258, 534, 535

[56] References Cited

U.S. PATENT DOCUMENTS

| | | | |
|---|---|---|---|
| 1,163,058 | 12/1915 | Belbanci | 210/258 |
| 1,372,119 | 3/1921 | Congleton | 210/258 |
| 1,985,435 | 12/1934 | Watson | 210/258 |
| 2,988,221 | 6/1961 | Culp | 210/104 |
| 3,883,429 | 5/1975 | Hanford | 210/104 |
| 4,132,685 | 1/1979 | Bottomley et al. | 210/104 |
| 4,515,684 | 5/1985 | Brown | 210/803 |
| 4,626,357 | 12/1986 | Finger et al. | 210/744 |

FOREIGN PATENT DOCUMENTS 565374 10/1958 Canada.
304705 4/1913 Fed. Rep. of Germany.

Primary Examiner—Peter Hruskoci
Assistant Examiner—Christopher Upton
Attorney, Agent, or Firm—Francis X. LoJacono

[57] ABSTRACT

An apparatus and method of removing lead contaminants from drinking water wherein the apparatus includes a first lead-separator tank which receives water from an incoming line. Lead particles are allowed to settle to the bottom of the first separator tank for sequential deposit in a waste tank. A second lead-separator tank receives water from the first tank by means of a mist spray. Lead particles are further precipitated and collected at the bottom of the second tank, and again are sequentially discharged into the drain tank. The second separator tank is connected to a third separator tank, whereby water from the second separator tank is siphoned off and transferred to the third separator tank. Any remaining lead particles in the last tank are again discharged into the waste-water tank. The lead-free water in the last tank is allowed to be directed to various outlets for drinking or cooking purposes only. The remaining or waste water from the waste tank is used for various other purposes, such as washing.

13 Claims, 1 Drawing Sheet

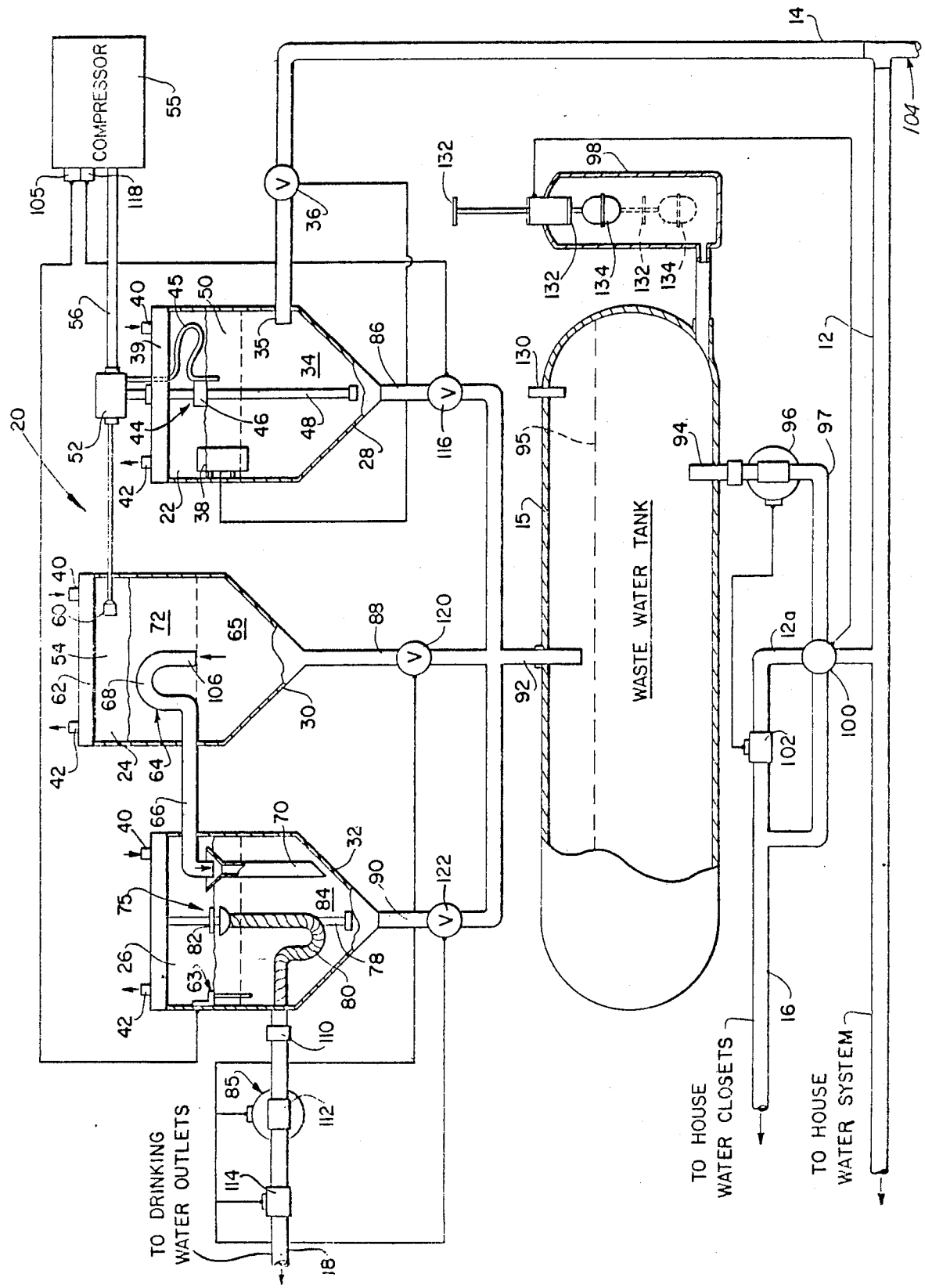

HEAVY-METAL SEPARATOR FOR DRINKING WATER

BACKGROUND OF THE INVENTION

1. Field of the Invention

This invention relates generally to a heavy-metal separator for water, and more particularly to an apparatus and method of removing lead contaminants from drinking water.

2. Description of the Prior Art

There is a crucial need for a suitable means for removing lead from drinking water, particularly water that is derived from local water systems for human consumption. Water entering a house or building will pick up lead particles as it is transported through the plumbing system. This is particularly true if water is passed through copper pipe fixtures having joints and connections bonded by lead solder or if the pipes themselves consist of lead, as is the case with many older systems.

It is an established fact that too much lead in the human body can cause serious damage to the brain, kidneys, nervous system, and red blood cells. There is great risk with short-term exposure to a young child or a pregnant woman. It has been further established that most of the lead in household water usually comes from the plumbing in houses, not from the local water source. Lead contamination is higher when water has not been drawn for six hours or longer, and hot water is likely to contain even higher levels of lead.

There are various types of metal-removing systems but these known systems or devices have restrictive features, are complicated to operate, and are generally not compatible as simple home-use systems for removing lead from water to be used for drinking or cooking.

As examples of the prior art, one may look to the following United States patents:

Pat. No. 4,096,064 to du Fresne discloses a system for removal of toxic heavy metals from drinking water and relates to a process and system for the removal of metal ions from water, such removal being accomplished electro-chemically by sequential water flow through reactant beds of activated zinc and magnesium/manganese alloy, respectively.

Pat. No. 4,622,102 discloses an automatically operable distillation apparatus which would not solve the above-mentioned peoblem.

Pat. No. 4,338,200 to Zeijlstra discloses a process for the removal of heavy metals from aqueous liquids which contain the metals in ionic form. In particular, the invention relates to the removal of chromium, zinc and/or lead from effluent discharge. This process also does not address the problem solved by the present apparatus herein disclosed.

It has been found that most water-purification systems use distillation methods or are chemically controlled.

SUMMARY AND OBJECTS OF THE INVENTION

The present invention has for an important object a provision wherein lead contaminants in drinking water can be readily separated from the plumbing system of a house by a very efficient and safe process.

It is another object of the present invention to provide a system for removing lead from drinking water wherein a dual water-flow system can be established within an existing plumbing system.

Still another object of the present invention is to provide an apparatus and method of removing lead contaminants from water supplied by the main incoming water line in a house, so as to supply lead-free water for drinking or cooking purposes, by means of a water sub-system or supply line that connects to the lead-separating apparatus. Water that is lead-free is thus discharged to all water-line outlets that are to be used for drinking, while the separated lead-contaminated water is discharged downstream of the main line that supplies untreated water to the house that is to be used for other purposes, such as washing.

A still further object of the invention is to provide an apparatus of this character that includes three lead-separator tanks in which lead-contaminated incoming water is stored. The first tank which has the heaviest concentration of lead is arranged to allow the lead particles to settle to the bottom of the tank for discharge. Then the surface water from the first tank is transferred to a second tank by means of an atomizer. Again, water in the second tank allows for lead particles to drop to the bottom for discharge. An overflow pipe is positioned in the second tank to siphon off approximately the first two gallons of surface water into a third tank. Any remaining lead particles settle to the bottom of the tank, thus leaving lead-free the remaining upper portion of the water which is then distributed through a sub-system for drinking purposes only. Accordingly, this apparatus and method provides a system that provides pure drinking water which is separated from lead-contaminated water by a process of fluctuation and sedimentation wherein the lead-free water is separated naturally from lead-contaminated water without the use of chemicals.

It is a further object of the invention to provide an apparatus and method of this character wherein the water-separation process utilizes the step of atomizing water under pressure in ambient temperature.

It is still another object of the invention to provide an apparatus of this type having relatively few operating parts.

A further object of the invention is to provide an apparatus and method as summarized above which is relatively inexpensive, is easy to service and maintain, and is simple in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring to the accompanying drawings which are for illustrative purposes only; there is shown a diagrammatic flow and process arrangement of the present invention having a dual water-flow system.

DESCRIPTION OF THE PREFERRED EMBODIMENT

Referring more particularly to the diagrammatic drawing, there is shown a dual water-flow system. This system comprises a main incoming utility water line 10 that connects to the main incoming house water line 12. Water fed by main water line 10 is generally contaminated with various impurities, one of which is lead. Thus, house line 12 is directed to and is part of a general flow system that does not allow discharge of contaminated water through outlets that are used for drinking. That is, the house line 12 represents a water-flow system that feeds the various household appliances as needed, such as a water heater, dishwasher, washing machine and water closet.

A water line 14 aids in defining a second water-flow system wherein line 14 connects to a means 20 for separating lead contaminates from the incoming water. During the lead separating process, the lead particles are captured and stored in a waste tank 15 for selective discharge through a pipe line 16 which connects to the various devices using waste water, such as water closets (not shown). The lead-free water for human consumption is discharged through drinking-water line 18.

A lead-separator means, generally indicated at 20, comprises a multiplicity of separator tanks which are preferably shown as three interconnected tanks or compartments 22, 24 and 26. The tanks are formed having cone-shaped bottom sections 28, 30 and 32, respectively. Water line 14 is connected adjacent the lower portion of tank 22 whereby lead-contaminated water 34 is discharged into tank 22 at 35. A flow-control solenoid valve 36 is operatively connected to a level-sensing means 38 which is positioned within tank 22 so as to control the amount of incoming contaminated water in line 14 by activating valve 36 when water in tank 22 drops to a predetermined level. As an example, each time the water level drops by one-half gallon, valve 36 which is normally closed will open to bring the water level therein back to a full position. Separator tank 22 includes a removable cover 39 having an air-intake vent 40 and an air-outlet vent 42.

A first water-siphoning means, designated generally at 44, is mounted to cover 39 and comprises a suction hose 45 connected at one end to float member 46 mounted to slide member 48, whereby only the upper surface area 50 of water 34 is suctioned off so as to be transferred to the second separator tank 24. First siphoning means 44 includes an atomizer 52 to which hose 45 is operably connected, whereby water from hose 45 is sprayed in a fine mist into the upper section 54 of tank 24 under pressure from compressor means 55. Air line 56 from compressor 58 is connected to atomizer 52 which forces water 50 into tank 24 through nozzle 60. Tank 24 also includes a cover 62 having air vents 40 and 42.

However, it should be noted that compressor 55 only operates in conjunction with a second water-level sensing means 63 located in separator tank 26. The sequential operation thereof will be disclosed in further detail hereinafter.

The discharge of water in tank 24 is controlled by a second siphoning means 64 which allows a predetermined amount of water 65 to be transferred to tank 26. Siphoning means 64 comprises a conduit member 66 having a goose-neck end 68 positioned in the upper section of tank 24. Thus, when water 65 rises above goose-neck end 68 the water will flow to tank 26. Water 65 is discharged into a funnel 70 whereby the water flows into the cone-shaped area 32, so that a predetermined amount of water is disposed in tank 26. Preferably, two gallons are taken from upper area 72 of tank 24 and replaced in tank 26.

Included in the last separator tank 26 is a second float-drain means, indicated generally at 75, and a second water-level sensing means 63. Tank 26 further includes cover 76 having suitable air vents 40 and 42. Drain means 75 comprises a guide post 78 which depends downwardly from cover 76 to which a flexible drain hose 80 is slidably mounted, along with a support float 82. This arrangement allows for the upper portion of water 84 to be drained off by pump means 85, thereby pumping water through clean-water discharge pipe 16.

Each cone-shaped lower section 28, 30 and 32 of the respective tanks 22, 24 and 26 are provided with drain ports 86, 88 and 90, respectively. These drain ports are connected to a central drain pipe 92 which communicates with waste-storage tank 15. Thus, lead-contaminated water from each separator tank is discharged into waste tank 15 and is released from the waste tank through drain conduit 94. Discharged contaminated water is allowed to be transferred through conduit 94 by means of waste-discharge pump 96, which is indirectly controlled by means of control switch 98. That is, control switch 98 is activated by the height of the level of water 95 in waste tank 15, and thereby opens or closes solenoid valve 100 which controls water flow between waste tank 15 and the main line 12. When valve 100 is open, water under pressure flows from line 12 through line 16. Accordingly, the change in pressure affects pressure switch 102 so that, when pressure drops below a given amount, the switch activates waste pump 96. This occurs when control switch 98 rises to close valve 100. Conversely, when the level of waste water 95 drops, it allows control switch 98 to open valve 100, thus providing the necessary pressure for switch 102 to turn off pump 96.

FLOW OPERATION

Water enters line 10 under pressure through house main pipe line 12 which provides a continuous flow of water throughout the general water system, as indicated by arrow 104. When solenoid valve 100 is normally open, water under pressure passes through pipe line 12a with the pressure of the water (approximately between 35 and 55 psi) affecting the switch 102 which, under pressure, is held in an off position, thus preventing pump 96 from operating. Water from line 12 continues through line 16 by way of line 12a.

Contaminated water from line 10 communicates with separator means 20 by way of line 14. Water flows into separator tank 22 through solenoid valve 36. When water 34 rises to a predetermined level in tank 22, a first level-sensing means 38 activates valve 36 to a closed position. The upper water surface area 50 is sucked through flexible line 45 by means of atomizer 52. As the water level is lowered, sensor 38 activates valve 36 to an open position, again allowing water to flow from line 14 into tank 22. Atomizer 52 is activated by the operation of compressor means 55 which, in turn, is operated by a second water-level sensor means 63 mounted in separator tank 26. When the level of water 84 in tank 26 recedes to a selected level, compressor 55 is caused to be operated by relay 105. At this time, a fine mist of water is sprayed from tank 22 into tank 24. Accordingly, when the water level of tank 24 rises over goose neck end 68, the upper section of water 65 flows through conduit 66 and discharges into tank 26 which raises the water level therein. Water will be transferred from tank 24 to tank 26 until the water level in the tank drops below the free end 106 of goose neck end 68.

Water is removed from the third separator tank 26 by means of a second float-drain means 75 whereby the upper portion of water, preferably the first two gallons thereof, is siphoned off through flexible hose 80 which is suspended by a float 82 which is slidably mounted to guide post 78. Water 84 flows into outlet line 18 which, at this time, is free from lead contamination. Outlet line 18 connects to one or more house outlets (not shown) which provide the lead-free water for drinking. Thus, drinking water flows only as it is used. That is, when the drinking-water outlet is opened, water is allowed to flow from tank 26 through check valve 110, which is interposed between tank 26 and pressure pump 112, and through pump 112 through pressure switch 114. As water is discharged, a pressure drop occurs in line 18, causing pressure switch 114 to activate pump 112. Preferably, pressure switch 114 should be set to turn on pump 112 at a drop of pressure below 20 psi, and turn the pump off at 30 psi. Therefore, the water level in tank 26 is affected so that it becomes lower each time a drinking outlet is operated; and, when the level drops to a set point, sensor 63 then causes the transfer of water from one tank to another, as previously described herein.

It now should be noted that water in the first separator tank 22 has the highest lead contamination. As water 34 is stored therein, heavy lead particles precipitate to the bottom of the tank and are deposited in drain port 86. Separator tank 24 is, therefore, filled with a less contaminated amount of water, because the lead particles or matter are further freed for precipitation due to the atomized spraying of the water being transferred from the first tank 22. These freed particles also settle to the bottom of separator tank 24 and collect in discharge-drain port 88.

Accordingly, the upper water area in each tank 22, 24 and 26 should provide a progressively cleaner water condition, with the third tank 26 having the purest water since any contaminates will again separate and settle within drain port 90. The left-over, lead-contaminated water in each drain port is allowed to be sequentially discharged into waste tank 15.

Drain port 86 is provided with a normally closed solenoid valve 116 and is opened by relay switch 118 which is activated at the time compressor 55 is activated by sensor means 63 in separator tank 26. Accordingly, drain ports 88 and 90 are both provided with drain solenoid valves 120 and 122, respectively, each valve being operated by pressure switch 114. As lead-free water flows through pipe 18, valves 120 and 122 are opened, allowing contaminated water to simultaneously drain into waste tank 15. It should be noted that discharge valves 116, 120 and 122 are each regulated to allow a predetermined amount of contaminated water to be discharged from their respective separator tanks. The amount of water discharged is, in turn, regulated by the predetermined amount of water that is deposited in the respective tanks.

Thus, as the normally closed discharge valves are opened, water from the respective drain ports will flow through connecting pipe or conduit 92 which communicates with waste tank 15. Water stored in waste tank 15 is pumped by pump means 96 into conduit 97 and passes through valve means 100, which is normally open, thus allowing water to flow to pipe or conduit 16. However, the opening and closing of waste-water valve means 100 is regulated by control-switch means 98 which, in turn, is caused to be operated by the level of water in waste tank 15. That is, when water 95 in waste tank reaches a level as shown, control-switch means 98 will switch valve means to a closed position, whereby waste water 95 can be pumped through conduit 97 and downstream into pipe 16 to the various waste-water outlets. It should be understood, however, that pump means 96 is operated by pressure switch 102 interposed between pipe lines 12a and 16. When pressure in line 16 drops below 35 psi, switch 102 activates pump 96; and when pressure therein rises above 55 psi, the switch shuts down the pump.

As waste water is discharged from waste tank 15, the level of water 95 drops and control switch 98 will again activate valve means 100 to an open position, thus allowing water to again flow from line 12 through valve means 100. A suitable control switch of this type is produced by Dayton Electric Manufacturing Co. as Automatic Float Switch Kit, Model 1P504. This unit comprises a micro-switch 130 and a pair of actuator discs 132, along with a float 134.

Thus, the present invention includes a purifying system and a waste-water system, wherein the waste water is provided by the direct in-line connection of incoming water and water from waste tank 14, and wherein the drinking water is provided by the purifying system.

The foregoing is a description of a preferred embodiment of the invention which is given here by way of example only. The invention is not to be taken as limited to any of the specific features as described, but comprehends all such variations thereof as come within the scope of the appended claims.

We claim:

1. An apparatus for removing lead contaminants from drinking water provided by an incoming water-supply source, comprising:

a first separator tank wherein lead-contaminated water from the incoming water-supply source is received therein for storage and to allow precipitation of lead particles to the bottom of said first separator tank;

means for controlling the flow of lead-contaminated water into said first separator tank from the water-supply source;

a first means for discharging lead-contaminated waste water from the bottom of said first separator tank;

a second separator tank for holding water from said first separator tank arranged to communicate with said first separator tank so as to receive selected water therefrom;

a first means for transferring water from said first separator tank having a reduced lead contamination to said second separator tank;

a second means for discharging lead-contaminated water from the bottom of said second separator tank;

a third separator tank for holding uncontaminated water transferred from said second separator tank;

a second means for transferring water from said second separator tank to said third separator tank;

a third means for discharging lead-contaminated water from the bottom of said third separator tank;

means for pumping lead-free water from said third separator tank under controlled pressure for drinking purposes;

a waste-water tank to receive lead-waste water from said first, second and third separator tanks, wherein said first, second and third discharge means communicate and connect to said waste water tank;

wherein said waste water tank includes:

a drain conduit connected to said waste-water tank whereby waste water is discharged from said waste water tank;

waste-water valve means located in said drain conduit;

switch-control means operated by the level of waste water in said waste-water tank, said switch-control means operating said waste-water valve means;

pressure-regulated pump means in drain conduit between said waste water tank and said waste-water valve means; and pressure-sensing means connected to said pressure regulated pump means, said pressure-sensing means being positioned downstream from said waste-water valve means.

2. An apparatus as recited in claim 1, wherein said first means for transferring water comprises:

a compressor means; and a spray means operated by said compressor means, said spray means arranged to communicate within said second separator tank for water deposit therein from said first separator tank.

3. An apparatus as recited in claim 2, wherein said compressor means is activated by a second level-sensing means mounted in said third separator tank, and wherein said first waste-water discharge means is activated by said second level-sensing means.

4. An apparatus as recited in claim 2, wherein said spray means includes a suction hose attached to a float member, whereby only the upper surface of said stored water in said first separator tank is transferred to said second separator tank.

5. An apparatus as recited in claim 3, wherein said second means for transferring water comprises a conduit connected between said second separator tank and said third separator tank, said conduit having a siphon end disposed in said second separator tank positioned to selectively siphon water therefrom.

6. An apparatus as recited in claim 5, wherein said means for pumping lead-free water from said third separator tank comprises:

a drain hose floatably mounted in said third separator tank;

a pump connected to said drain hose; and a pressure switch arranged to activate said pump and said second and third means for discharging lead-contaminated waste water into said waste water tank.

7. An apparatus as recited in claim 6, including a check valve located between said pump and said drain hose.

8. A method of separating lead particles from drinking water obtained from a main water-supply source, comprising the steps of:

supplying lead-contaminated water from an incoming water-supply source to a first separator tank;

allowing the lead particles to precipitate to the bottom of said first separator tank;

transferring the upper selective surface portion of water from said first separator tank to a second separator tank by means of a first transfer means;

allowing the lead particles in said second separator tank to precipitate to the bottom thereof;

siphoning the upper surface portion of water from said second separator tank by a second water transfer means so as to deposit said water into a third separator tank;

allowing the remaining lead particles to precipitate to the bottom of the third separator; and pumping lead-free water from said third separator tank;

discharging lead-contaminated water from the bottoms of said first, second and third separator tanks into a waste-water tank;

draining said lead-contaminated water from said waste-water tank into a drain conduit;

said draining being controlled by a valve means located in said drain conduit, said valve means operated by a switch control means operated by the level of waste water in said waste-water tank; and by a pressure-regulated pump means in said drain conduit between said waste-water tank and said valve means, said pump means operated by pressure-sensing means positioned downstream from said valve means.

9. A method as recited in claim 8, including the step of:

pumping the waste water from the waste-water tank through a pipe system carrying contaminated water not usable as drinking water.

10. A method as recited in claim 9, wherein transferring surface water from said first tank to said second tank includes the step of spraying said water under pressure into said second tank.

11. A method as recited in claim 10, wherein said water is sprayed in a mist form.

12. A method as recited in claim 11, wherein said mist spray is created by a compressor connected to an atomizer, and wherein said compressor is activated by a level-sensing means located in the third separator tank.

13. A method as recited in claim 12, including the step of:

providing a first level-sensing means within said first separator tank for activating a water-supply valve, allowing water to be deposited in said first separator tank as required.

* * * * *